(12) United States Patent
Dukes et al.

(10) Patent No.: US 10,067,752 B1
(45) Date of Patent: Sep. 4, 2018

(54) APPLICATION INSTALL NOTIFICATION

(71) Applicant: Twitter, Inc., San Francisco, CA (US)

(72) Inventors: Derek Dukes, San Jose, CA (US); Eric Maguire, San Francisco, CA (US); Kelton Lynn, San Francisco, CA (US); Amer Shahnawaz, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 14/820,499

(22) Filed: Aug. 6, 2015

(51) Int. Cl.
G06F 9/445 (2018.01)
G06F 8/61 (2018.01)
H04L 29/08 (2006.01)
G06Q 30/02 (2012.01)

(52) U.S. Cl.
CPC .......... *G06F 8/61* (2013.01); *G06Q 30/0267* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,345,386 B1 * | 2/2002 | Delo | ........................ | G06F 8/61 717/176 |
| 8,407,295 B2 * | 3/2013 | Mickeleit | ................ | H04L 51/38 709/206 |
| 8,838,087 B1 * | 9/2014 | Delker | .............. | H04M 1/72525 455/419 |
| 2014/0089376 A1 * | 3/2014 | Caldas | .................... | H04L 67/10 709/202 |

* cited by examiner

*Primary Examiner* — Qamrun Nahar
(74) *Attorney, Agent, or Firm* — Nixon & Vanderhye, P.C.

(57) ABSTRACT

A method and apparatus provides a user of a mobile device with a notification after an application (also referred to as an "app") has been downloaded and installed. A user interacting with an original app can select a link to download a new app. After download and installation of the new app has been requested, the original app polls the operating system to determine if the new app has been installed. A notification is provided to the user by the original app after the new app has been installed. A notification is also transmitted to an external server indicating that a user has requested downloaded, installed, and/or opened the application.

24 Claims, 10 Drawing Sheets

APPLICATION INSTALL NOTIFICATION

BACKGROUND

The present disclosure relates generally to installation of applications on a mobile device, and more particularly to determining that an application has been installed on a mobile device.

Many mobile devices support software applications (also referred to as "apps") that allow users to perform various tasks. For example, a messaging app allows a user to transmit and receive electronic messages. Although some apps come preloaded on a mobile device, many apps are selected for download and installation by a user. Apps are often downloaded in response to links or buttons presented to a user while operating another app. In these situations, while operating within an original app, a user selects a new app for download and installation. An operating system of the mobile device initiates the download and installation of the new app on the device and allows a user to continue working with the original app. The new app is downloaded and installed with no indication provided to the original app that the installation has been completed.

SUMMARY

In one embodiment, a method for notifying a user of a mobile device that an app has finished being installed on the mobile device includes displaying, via first application operating on a mobile device, an option to install a new application. A request is received from a user via the first application to download the new application. In response to the request, an action is performed to enable the user to initiate download of the new application. In one embodiment, the action includes transmitting a call to an operating system of the mobile device to initiate download of the new application. After the action is performed, it is determined whether the new application has been installed via one or more calls made from the first application to the operating system of the mobile device. A notification is transmitted to an external server associated with the first application. The notification includes data pertaining to installation of the new application.

In one embodiment, the determining comprises polling the operating system. The polling can include querying the operating system to determine if the new application is currently installed on the mobile device. The polling can include querying the operating system to determine all applications currently installed on the mobile device and determining if the new application is identified in a list of all applications currently installed on the mobile device generated by the operating system in response to the query. Polling can occur a predetermined amount of time after initiating download and periodically during download and installation of the new application.

A notification can be displayed to a user indicating that the new application has been installed. In one embodiment, the notification is displayed within the first application in response to determining that the first application is active. In another embodiment, the notification is displayed via a pop-up message in response to determining that the first application is executing and not active. The notification can include an option to open the new application. Data of the notification transmitted to the external server can include an indication that a user requested installation of the new application, an indication that the new application was installed, and dates and times associated with the request for installation of the new application and the installation of the new application. In one embodiment, the data of the notification transmitted to the external server comprises an indication that a user requested to open the new application and a date and time associated with when the new application was opened.

In one embodiment, the displaying an option to install the new application includes displaying the option to install the new application in a message of the first application comprising an advertisement related to the new application. The data pertaining to the installation of the new application comprises information related to conversion of the new application for monetization.

In one embodiment, the call to the operating system includes requesting that an app store or application marketplace is launched by the mobile device by transmitting a message comprising a deeplink identifying the new application. The app store or application marketplace uses information in the deeplink to identify the new application and display an option to install the new application via a display of the mobile device in response to the requesting.

In one embodiment, polling ends a predetermined time (e.g., 15 minutes in one embodiment) after the receiving a request from the user to download the new application if it is determined that the new application has not been installed. In another embodiment, the first application continues to poll the operating system for a remaining polling period in response to the first application being re-opened after the first application has been closed before the end of the polling period. The data of the notification is such embodiments include an indication that the new application has been installed in response to determining that the new application has been installed. In one embodiment, the first application polls the operating system once in response to the first application being re-opened after the end of the polling period and after being closed during the polling period.

In one embodiment, a method includes identifying an advertisement to be displayed via a first application operating on a mobile device, the advertisement pertaining to installing a new application. It is then determined whether the new application has been installed on the mobile device. The advertisement is reconfigured to display an option to open the new application in response to determining that the new application has been installed. The reconfigured advertisement is then displayed via a display of the mobile device. In one embodiment, a requested form a user via the first application is received to open the new application. In response to the request, an action is performed to open the new application. A call to an operating system of the mobile device to open the new application is then transmitted. In one embodiment, a notification is transmitted to an external server associated with the first application. The notification comprises data pertaining to opening the new application, the data for tracking conversion of the new application and tracking an advertising budget of an entity associated with the new application An apparatus and computer readable medium for notifying a user of a mobile device that an app has finished being installed on the mobile device are also described.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

In one embodiment, a mobile device user is notified when a selected new application (also referred to as an "app") has been downloaded to and installed on the mobile device. The notification, in one embodiment, is presented to the user while the user continues to interact with an original open app. A notification is also sent to a server indicating that a user has selected to install the new app and can also provide an indication as to whether the user has opened the new app.

Figure 1:
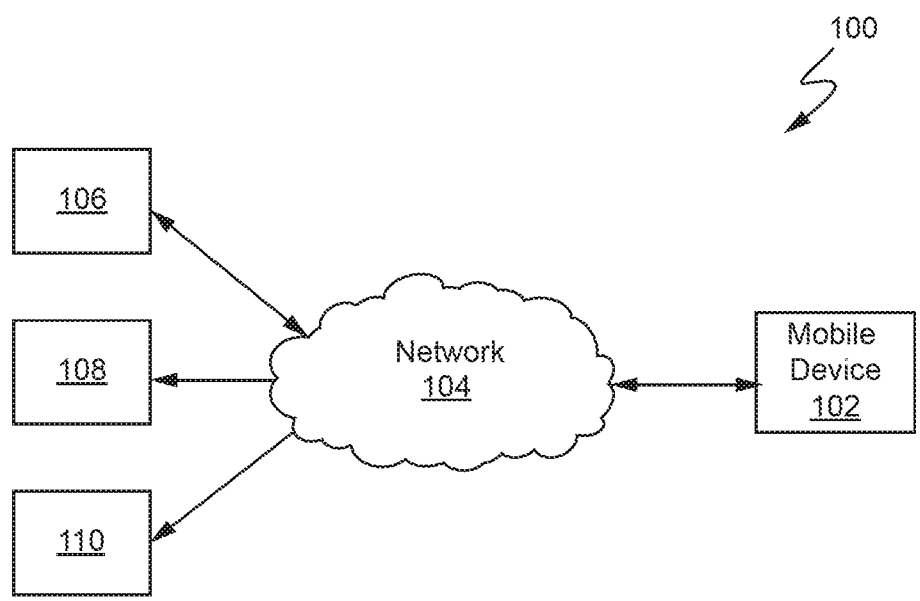
FIG. 1 depicts a schematic diagram of a system in which one or more embodiments of the invention may be implemented.

FIG. 1 depicts a system 100 in which mobile device 102 communicates via network 104 with one or more remote computers 106, 108, and 110. Mobile device 102, in one embodiment, is a smart phone but may be any type of mobile device capable of messaging and downloading, installing, and running apps. The apps that mobile device 102 downloads and installs can be provided by one or more of computers 106, 108, and 110. In addition, computers 106, 108, and 110, in one embodiment, transmit and receive information from mobile device 102 to provide information to various apps on mobile device 102. For example computer 106 may be a messaging server. In this example, computer 106 communicates with mobile device 102 to transmit and receive messages. Computer 106, in one embodiment, is in communication with other mobile devices to transmit and receive messages.

Figure 2:
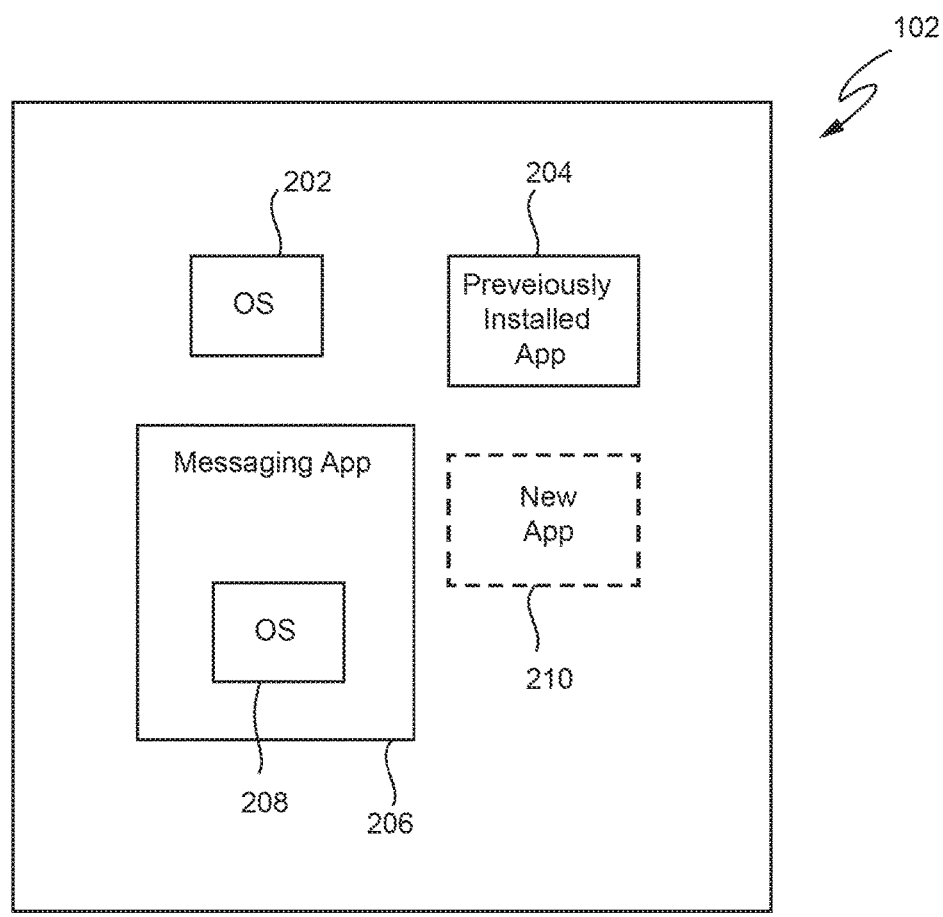
FIG. 2 depicts a schematic diagram of a mobile device, in accordance with one or more embodiments of the invention.

Mobile device 102 of FIG. 1 comprises one or more of a variety of inputs and outputs such as a touch screen, microphone, speaker(s), button(s), camera(s) etc. FIG. 2 depicts a high level schematic of mobile device 102. Mobile device 102 comprises operating system 202 which supports operation of the device and software apps. Previously installed app 204 may be any one of a variety of apps either preloaded onto mobile device 102 or previously downloaded and installed. Messaging app 206 is supported by operating system 202 and allows a user to transmit and receive messages from other users via their mobile devices or other devices that support similar messaging. New app 210, as shown in FIG. 2 with broken lines, is a particular app that a user requests to install. Since new app 210 is not yet installed, it is shown using broken lines.

Messaging app 206 comprises polling module 208 which, in one embodiment, allows messaging app 206 to determine if a new app has been downloaded and installed in accordance with embodiments of the invention. Although polling module 208 is shown as part of messaging app 206, polling module 208 can be part of other apps or part of operating system 202.

Figure 3:
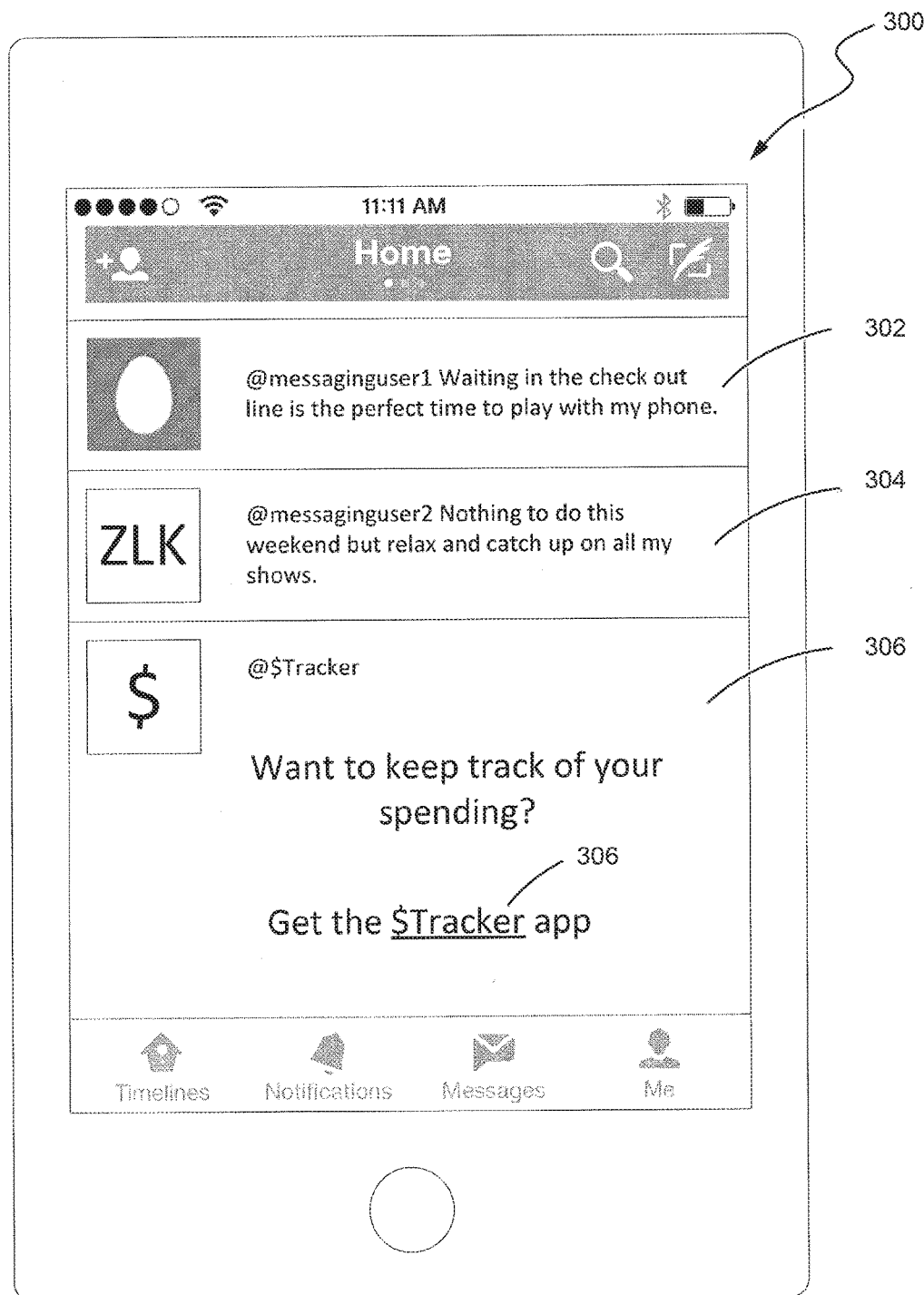
FIG. 3 depicts a display of a mobile device, in accordance with one or more embodiments of the invention.

FIG. 3 depicts display 300 of a mobile device such as mobile device 102 of FIG. 1. Display 300 is shown in FIG. 3 depicting a message stream including messages 302, 304 and card 306 which is presented to a user while using a messaging app, such as messaging app 206 of FIG. 1. Messages 302, 304 are messages selected for display, in one embodiment, based on associations between a user of device 102 and a messaging account used to generate messages 302, 304. Card 306, in one embodiment, is a message which can include media, links, and additional data to a message presented to a user in the message stream. Card 306 is depicted including link 308 comprising the text "Get the $Tracker app". A user can select the link 308 in order to download and install the $Tracker app.

A user touching via a touch screen or otherwise selecting link 308 initiates download and installation of an app, in this example, the $Tracker app. Messaging app 206 transmits data to operating system 206 in response to the user selecting link 206 and operating system 202 opens, for example, a download app that initiates download and installation of the $Tracker app. In one embodiment, in response to the user selecting link 308, display 300 is updated to depict information concerning the $Tracker app.

Figure 4:
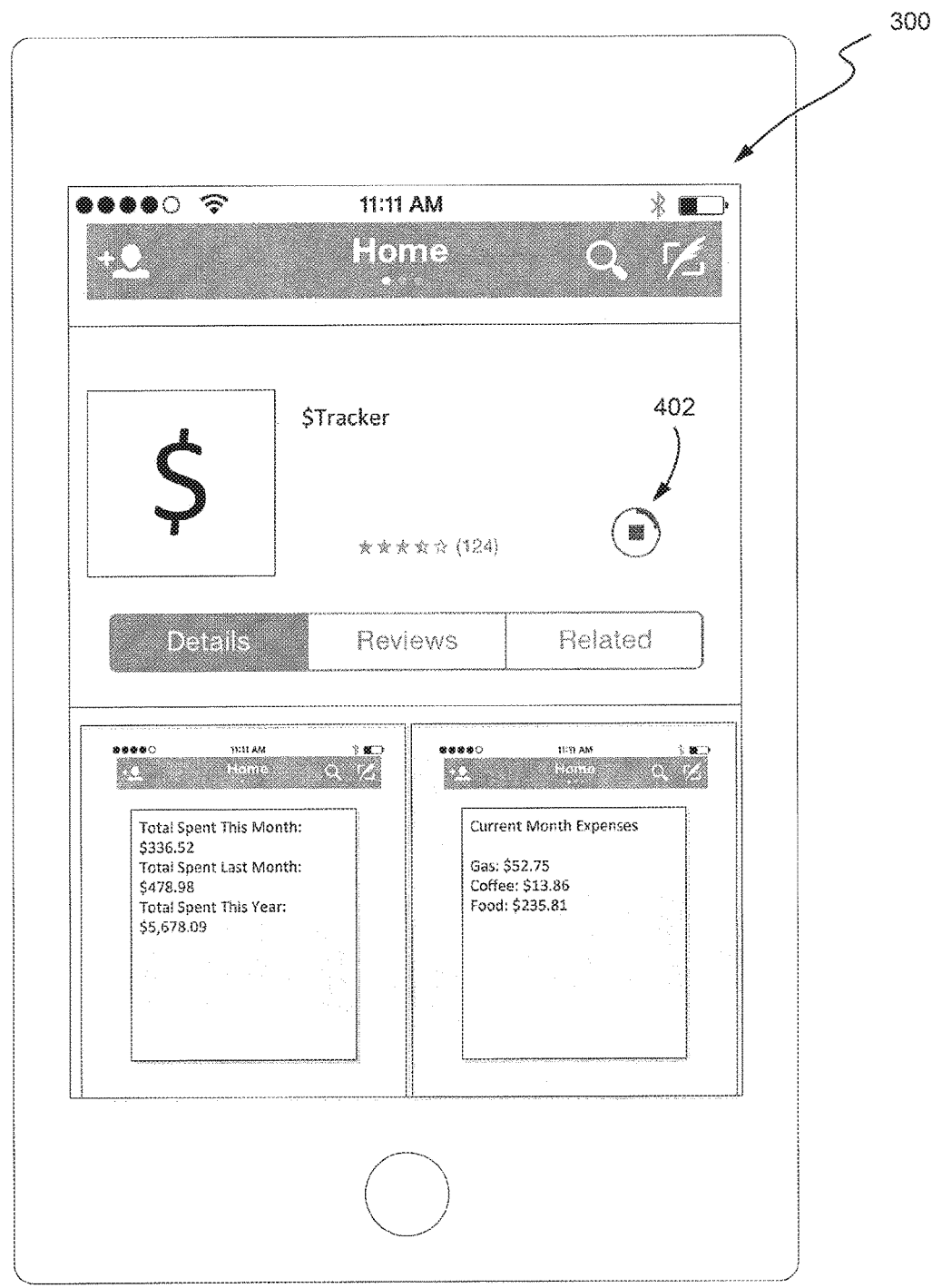
FIG. 4 depicts a display of a mobile device, in accordance with one or more embodiments of the invention.

Display 300 in FIG. 4 provides a user with various information concerning the app identified in card 306 of FIG. 3 (in this case, the $Tracker app). In one embodiment, a user can click a link to begin download and installation of the app. Download progress indicator 402 is then displayed indicating download progress. In one embodiment, operating system 202 updates display 300 to return the user to the message stream facilitated by messaging app 206 as shown in FIG. 3. A user may be returned to the message stream a predetermined time after download of the $Tracker app has begun. In other embodiments, a user can return to the message stream shown in FIG. 3 by swiping, selecting a link, or other input. In response to the user input operating system 202 returns the user to the message stream facilitated by messaging app 206 so that the user can continue to interact with messaging app 206 while the $Tracker app downloads and installs.

After the download and installation are initiated, polling module 208 of messaging app 206 waits a predetermined amount of time and then polls operating system 202 to determine if installation of the $Tracker app has finished. The polling of operating system 202 to determine if an app has been downloaded and installed can occur in multiple ways (e.g., depending on the capabilities of operating system 202).

In one embodiment, polling module 208 transmits a request to operating system 202 to inquire as to whether installation of the $Tracker app has finished. In this embodiment, polling module 208 inquires as to whether a particular app, in this case, the $Tracker app, has finished downloading and installing. If installation has not finished, polling module 208 waits a predetermined period of time before transmitting another request to operating system 202. In one embodiment, polling module repeatedly polls operating system 202 for a predetermined period of time (e.g., 15 minutes in one embodiment) before polling is discontinued. The polling continues until installation of the app has been completed, is interrupted by some other processor or app, or the polling period ends. In one embodiment, if an application that initiated a download is closed but not terminated (i.e., the app is closed but continues to run in the background) the polling continues. In such embodiments, closing but not terminating the application enables an "out of app" notification which can be sent even if the app that initiated the download is not open when the download is finished. In one embodiment, if an application that initiated download is terminated (i.e. closed and no longer running), either by the user or by the operating system based on system resources, then polling stops.

Some operating systems are not capable of answering queries pertaining to installation of a particular app. However, most operating systems are capable of providing a list of currently installed apps in response to a query. In one embodiment, polling module 208 transmits a request to operating system 202 requesting a list of apps currently installed on device 102. Prior to the app being downloaded, the list of apps currently installed on device 102 will not include the new app current being downloaded and installed. After the new app has been downloaded and installed, the list of apps currently installed on device 102 will include the new app selected for download and installation. In one embodiment, polling of operating system 202 occurs periodically until the new app is included in the list of apps currently installed on device 102. When the new app is included in the list of apps currently installed on device 102, it can be inferred that download and installation of the new app has been completed.

Figure 5:
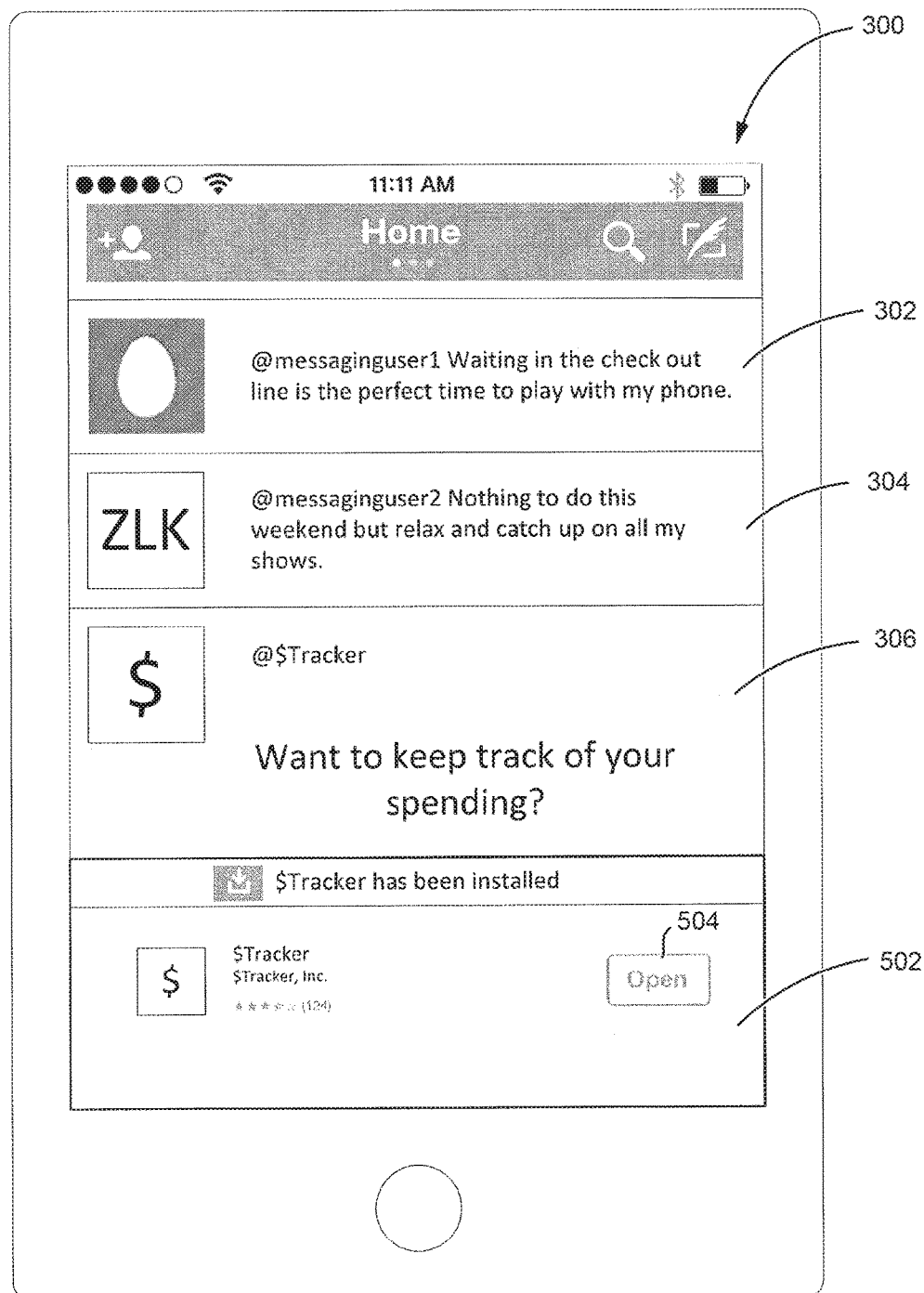
FIG. 5 depicts a display of a mobile device, in accordance with one or more embodiments of the invention.

After installation of the $Tracker app has finished, a notification is presented to the user. FIG. 5 depicts display 300 of a mobile device such as mobile device 102 of FIG. 1. Display 300 depicts a message stream including messages 302, 304, card 306, and notification 502. Notification 502, in one embodiment, is displayed to the user after installation of an app is completed. In this example, notification 502 states "$Tracker installation complete". In one embodiment, notification 502 is displayed in a pop-up window to the user. In such embodiments, notification 502 is displayed overlapping a current display of information to the user. As shown in FIG. 5, notification 502 is shown over card 306. In one embodiment, notification 502 includes link 504 to open the app to which the notification pertains.

Figure 6:
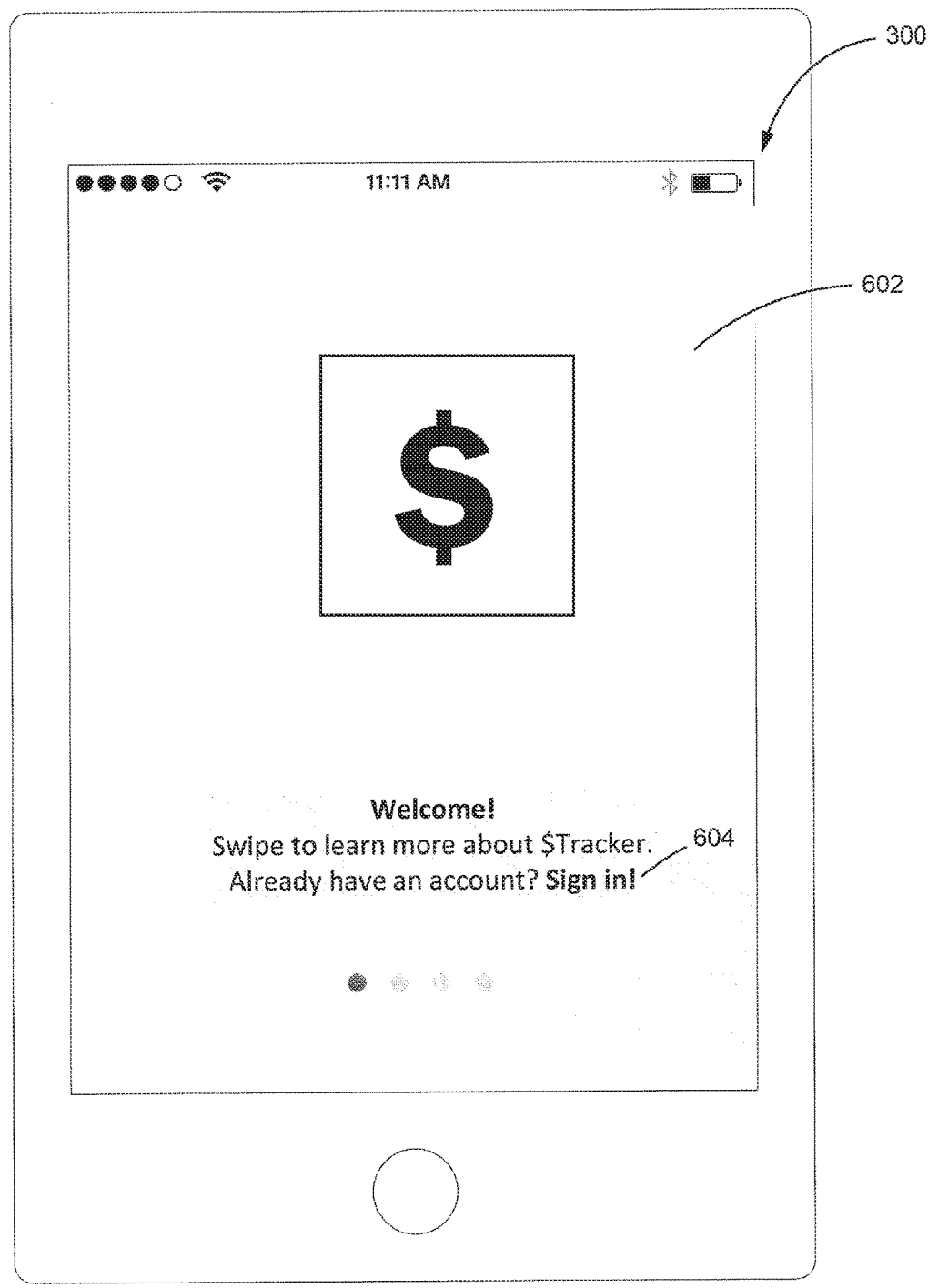
FIG. 6 depicts a display of a mobile device, in accordance with one or more embodiments of the invention.

FIG. 6 shows display 300 updated to depict welcome screen 602 for the $Tracker app in response to a user selecting link 504 of FIG. 5. As shown in FIG. 6, a user is provided an opportunity to learn about the app by swiping. A user is also provided with an option to sign in to the app via link 604. The information displayed to a user is based on the app the user is opening. For example, the $Tracker app displays welcome screen 602 after a user opens it. Other apps may present the user with different displays.

Figure 8:
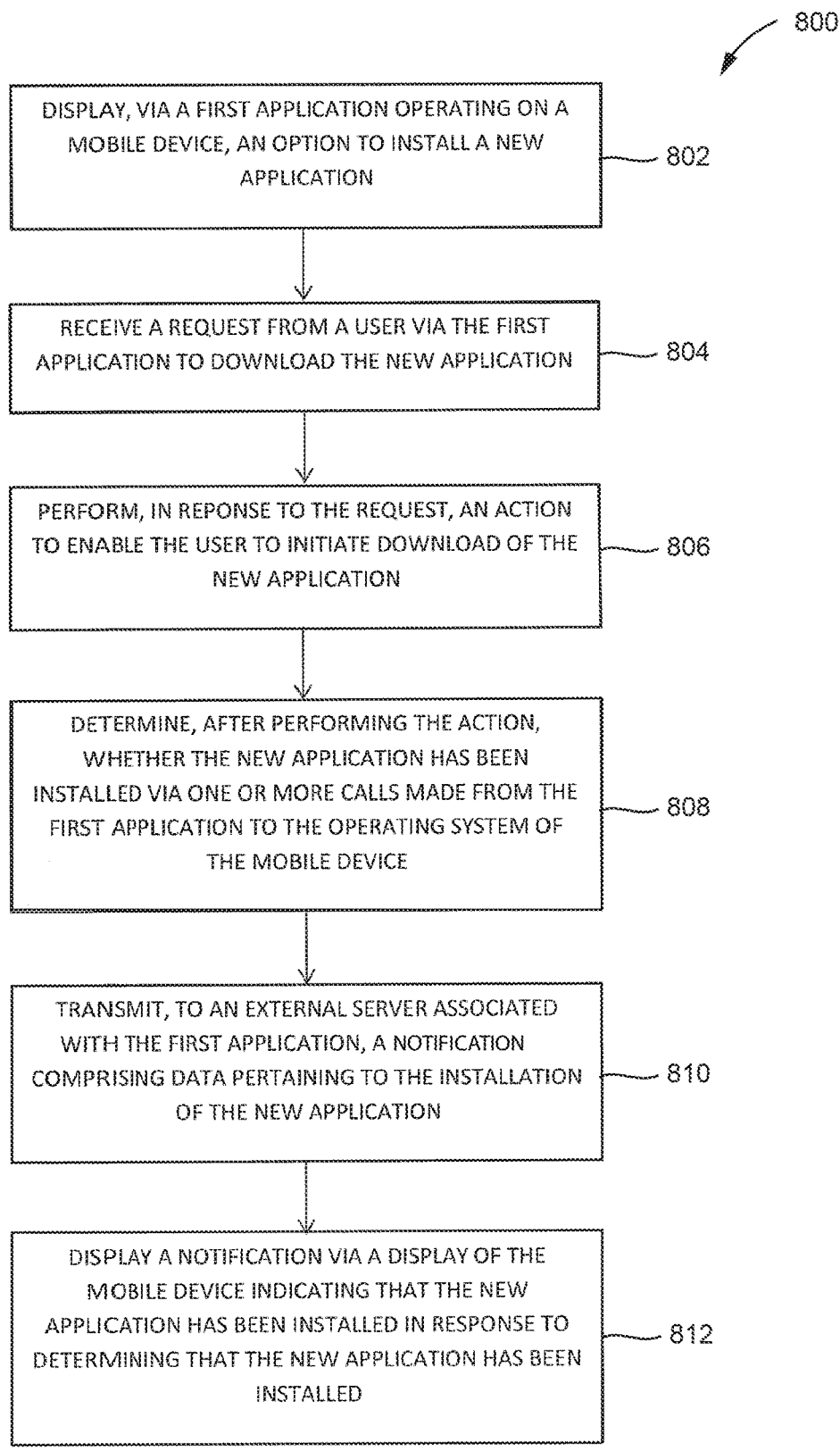
FIG. 8 depicts a flowchart of a method for notifying a user that an app has been downloaded and installed, in accordance with one or more embodiments of the invention.

The details of the steps performed as described in conjunction with Figure method 800 of FIG. 8 and what is displayed to a user can vary based on an operating device of the mobile device. For example, the details of the steps of method 800 of FIG. 8 and information displayed to a user can be based on whether a mobile device is running an APPLE operating system (e.g., iOS) or another operating system such as ANDROID.

For users with mobile devices using iOS, after a user selects a link to install a new app, an operating system associated with a messaging app supporting a card or message displaying the link detects an install_app event. An app install sheet associated with the new app is displayed to the user (e.g., as shown in display 300 of FIG. 4) and a user may confirm that the new app should be downloaded and installed by clicking a link and/or entering a password associated with the user. In response to confirmation from the user, or after a predetermined period of time, the user is returned to the display and/or app in which the user was presented with the option to download and install a new app. After the install_app event, the messaging app operating system begins polling to determine if the new app has finished download and installation. In one embodiment, the polling period continues for 15 minutes but can be for other periods of time. If download and installation of the new app is completed within the polling period, the user is presented with a notification that the app has successfully downloaded and installed. The messaging application operating system may then log the scribe event installed_app. In one embodiment, the scribe event installed_app is logged reusing an existing event that is scribed when a deeplink for the new app is tested immediately after the app install sheet is closed. The notification can contain a link to open the new app (e.g., see link 504 of FIG. 5) which launches the newly installed app when selected. The messaging app operating system may log a new scribe event, first_app_open, after the user selects to open the newly installed app. In one embodiment, the actual deeplink used on the install notification should append "install_referrer=" followed by an identification of the messaging app that presented the link to download and install the new app. This "install_referrer=" parameter (followed by an identification of the messaging app) enables an app to track when the newly installed app is first opened. The "install_referrer=" parameter also allows for customization of the newly installed app onboarding experience (e.g. how the app is presented to the user when opened for the first time).

For users with mobile devices using the ANDROID operating system, after a user selects a link to install a new app, an operating system associated with a messaging app supporting a card or message displaying the link detects an install_app event. A user is then directed to an app for downloading new apps (e.g., the Google App Store). After the install_app event, the messaging app operating system polls the ANDROID operating system over a predetermined amount of time (e.g., 5, 10, or 15 minutes). Since the ANDROID operating system is capable of answering queries pertaining to installation of a particular app, the messaging app operating system polls the ANDROID operating system to determine if the user selected app has been downloaded and installed by querying using an identifier associated with the new app. In one embodiment, after download and installations of the new app is complete, the user is presented with a notification containing a link for opening the newly installed app. The notification contains a link (e.g., link 504 of FIG. 5) which may be associated with a deeplink that is used to open the newly installed app.

In one embodiment, if a user is no longer actively using an app from which download and installation of a new app was initiated, alternative notifications may be used to alert the user that the new app has been successfully downloaded and installed. For example, an app push notification may be delivered to a user indicating that the new app has been downloaded and installed if the user is no longer actively using an app from which download and installation of the new app was initiated.

In one embodiment, notifications pertaining to the download and installation of a new app may be configured by a user via a settings menu. For example, a user may be given the option to have in app notifications or push notifications enabled or disabled.

Figure 7:
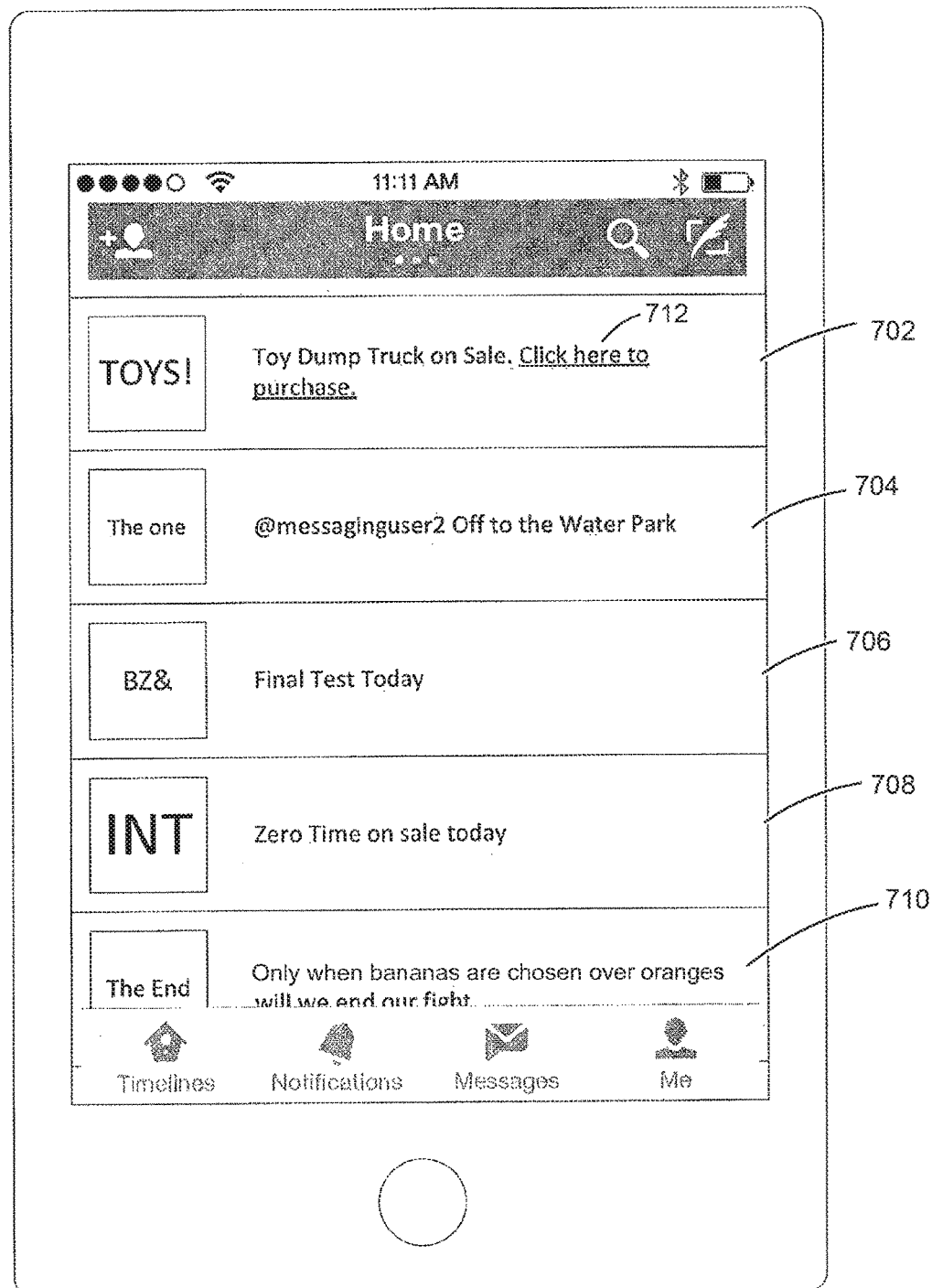
FIG. 7 depicts a display of a mobile device, in accordance with one or more embodiments of the invention.

In one embodiment, a card or message contains a link that can be selected to make a purchase. For example, an online retailer may post a message or card to a messaging system including a link that can be selected to facilitate purchase of goods or services. FIG. 7 depicts display 300 of a mobile device such as mobile device 102 of FIG. 1. Display 300 is shown in FIG. 7 depicting a message stream including messages 702, 704, 706, 708, and 710. Message 702 indicates that toy dump trucks are currently on sale from a retailer and is shown including link 712 represented by the phrase "Click here to purchase." In one embodiment, a user can select or click on link 712 and, in response, a user will be presented with a display for facilitating purchase of the toy dump truck. In one embodiment, link 712 is associated with a deeplink which contains information concerning the product to be purchased and the retailer from which the product can be purchased. In response to a user selecting or clicking link 712, messaging app 206 (shown in FIG. 2) transmits data to operating system 202 instructing the operating system to facilitate purchase of the item associated with link 712. In one embodiment, purchase requires a new app to be downloaded and installed before the purchase can be initiated.

In one embodiment, in response to user input requesting a purchase via a link presented by messaging app 206, messaging app 206 will first poll operating system 202 to determine if an app required to complete the purchase is installed on mobile device 102. If the app required to complete the purchase is not currently installed on mobile device 102, messaging app 206 will initiate download and installation of the app required to complete the purchase via operating system 202. Download and installation of the app required for purchase may require approval from the user before download and installation can begin. After download and installation has begun, messaging app 206 will then poll operating system 202 to determine if the app required to complete the purchase has been downloaded and installed. After the app required to complete the purchase has been downloaded and installed, messaging app 206 instructs operating system 202 to open the app required to complete the purchase and identified by link 712. For example, messaging app 206 can instruct operating system 202 to open a newly installed application associated with a retailer of the item identified by link 712. In response, operating system 202 opens the application associated with the retailer and presents content of the application to the user. In one embodiment, data transmitted from messaging app 206 in response to a user selecting link 712 includes one or more of user data, app data, and item data. For example, in response to a user selecting a link 712 to purchase an item from a retailer via the retailer's app, user data identifying the user and payment information, app data identifying a specific app to be used in completing the purchase, and item data pertaining to the item to be purchased may be transmitted from messaging app 206 to operating system 202. In response to this information, in one embodiment, operating system 202 opens the specific app and passes user data and item data to the specific app. Passing of user data and item data from operating system 202 to the specific app allows the specific app to present the user with purchase information for the item. In one embodiment, the user is presented with a summary of an order for the item using the user data and item data. In one embodiment, the user is required only to confirm that the user would like to purchase the item by clicking a virtual button (e.g., a confirm button). In one embodiment, after purchase of the item, the user is returned to messaging app 206.

Links in messages or cards, such as link 306 and link 712, in one embodiment are associated with a deeplink. A deeplink, in one embodiment, is the format by which information can be passed between a card and an application. A deeplink is a hyperlink that includes information to locate a specific webpage, specific content, or a specific app. A deeplink can also include information to open an app to a particular location within the app. A deeplink can include additional data to be used by the specific webpage or specific content. For example, a deeplink may identify a particular user and include various information related to the user. In one embodiment, a deeplink can identify a particular product or service. For example, a deeplink may identify an app to be opened by an operating system. In addition, the deep link may include user identification information and product or service identification in order to open the app and present a particular service or product for immediate purchase by the user. A deeplink can also include device identifiers, referral source information (e.g., publisher or advertising campaign details), discount codes associated with an advertising campaign, as well as any information that can be passed in a website uniform resource locator (URL).

Each deeplink has a deeplink schema comprising ordered information. For example, in one embodiment a deeplink is a uniform resource identifier (URI) or a uniform resource locator (URL). A deeplink schema for an app is typically defined by an operating system executed on a related user device. A basic deeplink schema for a particular app can be determined by polling the operating system. Polling the operating system also facilitates determination of how app developers of a particular app generate and utilize a particular deeplink schema for the particular app. It should be noted that a particular app may have more than one associated deeplink. For example, a first deeplink may identify the app while additional deeplinks may be used to pass information to the app, open an app, and perform a function after opening an app.

In one embodiment, deeplink schemas for every app that has an associated deeplink are saved in table. The table allows users and the operating system to determine one or more deeplinks associated with an app. For example, a mact_apps table may be used to store deeplinks associated with apps. The mact_apps table may be updated periodically or in response to a command or request to reflect changes to deeplinks.

In one embodiment, information concerning a user selecting to install an application can be stored in a memory of the mobile device on which the installation request was received. For example, an identification of the application a user has selected to install, a date and time the user selected to install the application, and an indication of how the user was presented with the option to install (e.g., an existing application that presented the user with the option to install the new application) can be stored in a memory for later use and/or analysis (e.g., conversion tracking). Similarly, information concerning installation of an application selected by a user and when a user opens the installed application can also be stored. This information can be transmitted from the mobile device to a server for analysis. This information can be used to track how a particular entity influences a user to download, install, and/or open the application. For example, a particular application in which the user was presented with the opportunity to install an application can be attributed with causing the user to install the application. The particular application can also be attributed with causing the user to open the application after installation. An entity associated with the particular application can then be provided with a monetary benefit, such as a payment, in response to causing a user to install and/or open a new application. In one embodiment, transmission of information from an app to a server concerning download, install, and opening of a new app is referred to as a scribe event. In one embodiment, the server can analysis information received concerning download, installation, and or opening of an application in order to determine whether credits for each download, installation, and or opening can be attributed to a particular entity.

In one embodiment, a party seeking to have advertisements displayed to users is charged based on one or more actions taken by a user. In one embodiment, a party is changed based on a user clicking on an advertisement that occurs within an application and initiates a download (e.g. a download of a new application or additional information). In one embodiment, a party can be charged based on a user clicking a notification that indicates a download has finished or a user clicking on a notification indicating that a download has finished and allowing a user to open a downloaded application. A party can be charged based on other actions as well. For example a party can be charged based on conversion events such as when a newly downloaded application has been fully installed, first opened, or when a purchase associated with the newly downloaded application is initiated or completed. An entity can be credited with a user installing a new application if the new application is installed on the user's mobile device within a specified time period after an option to download the new application was presented to the user via an application associated with the entity.

FIG. 8 depicts a flowchart of method 800 for displaying an option to install a new application to a user and notifying a user of a mobile device that an app has finished being installed on the mobile device according to one embodiment. At step 802, a first application, such as messaging app 206, displays an option to a user to install a new app. In one embodiment, the option is displayed in a message or card. At step 804, a request is received from a user via the first application to download the new application. This request, in one embodiment, is in the form of user input, such as a user selecting or clicking a button displayed in message or card. At step 806, in response to the request, an action to enable the user to initiate download of the new application is performed. In one embodiment, the action is performed by the first application (e.g., messaging app 206). At step 808, it is determined whether the new application has been installed via one or more calls made from the first application to the operating system of the mobile device. At step 810, a notification comprising data pertaining to the installation of the new application is transmitted to an external server associated with the first application. At step 812, a notification is displayed via a display of the mobile device indicating that the new application has been installed in response to determining that the new application has been installed.

In one embodiment, the determining whether the new application has been installed in step 808 comprises polling the operating system of the mobile device to determine whether the new application has been installed. In one embodiment, the polling comprises querying the operating system to determine if the new application is currently installed on the mobile device. In this embodiment, operating system 202 is capable of responding affirmatively to a query pertaining to installation of an individual app. In one embodiment, where operating system 202 is not capable of responding to a query pertaining to an individual app, the operating system is queried to determine all apps currently installed on mobile device 102. It is then determined if the new application is identified in a list of all applications currently installed on the mobile device generated by the operating system in response to the query. In one embodiment, the polling occurs a predetermined amount of time after initiating download of the new application and periodically during download and installation of the new application. Polling, in one embodiment, ends a predetermine period of time (e.g., 15 minutes in one embodiment) after the receiving the request from the user to download the new application if it is determined that the new application has not been installed. Polling can be affected by various user actions, such as closing the application which is polling the operating system. In one embodiment, the polling of the operating system continues for a remaining polling period in response to the first application being re-opened after the first application has been closed before the end of the polling period. In such embodiments, the data of the notification includes an indication that the new application has been installed. In one embodiment, the operating system is polled once in response to the first application being re-opened after the end of the polling period and after being closed during the polling period.

The notification of step 812 can be displayed in various ways. In one embodiment, the notification is displayed within the first application in response to determining that the first application is active (e.g., the first application is being accessed by and/or displayed to the user). In one embodiment, the notification is displayed via a pop-up messaging in response to determining that the first application is executing and not active (e.g., the application is still open but it is not currently being accessed by and/or displayed to the user). In one embodiment, the notification displayed to the user comprises an option to open the new application. In one embodiment, a notification can use operating system level notifications for the first application that initiated the download of the new application to allow a user to open the new application directly. In one embodiment, the first application is opened by the operating system after downloading of the new application is finished and the user is redirected to the new application (also referred to as "bounce through").

The notification transmitted to the external server can comprise various data. In one embodiment, the data of the notification comprises an indication that a user requested installation of the new application, an indication that the new application was installed, and dates and times associated with the request for installation of the new application and the installation of the new application. In one embodiment the data comprises an indication that a user requested to open the new application and a date and time associated with when the new application was opened.

In one embodiment, the displaying an option to install the new application comprises displaying the operation to install the new application in a message of the first application comprising an advertisement related to the new application and the data pertaining to the installation of the new application comprises information related to conversion of the new application for monetization.

In one embodiment, the performing an action to enable the user to initiate download of the new application in step 804 of FIG. 8 comprises transmitting a call to an operating system of the mobile device to initiate download of the new application. In one embodiment, the transmitting the call to the operating system comprises requesting that an app store or application marketplace is launched by the mobile device by transmitting a message comprising a deeplink identifying the new application. In one embodiment, the app store or application marketplace uses information in the deeplink to identify the new application and display an option to install the new application via a display of the mobile device in response to the requesting.

In one embodiment, the request to install a new app is associated with a deeplink. For example, a link in a message or card may be associated with a deeplink which contains additional information as described above. In such embodiments, the new app can be automatically opened by messaging app 206 when installation of the new app has finished. In one embodiment, the deeplink pertains to purchase of an item. In such embodiments, a purchase identified by information in the deeplink is initiated via the new app after it is opened using information in the deeplink. In one embodiment, purchase confirmation is requested from the user vie the new app. In such embodiments, the purchase confirmation is based on the purchase request.

Figure 9:
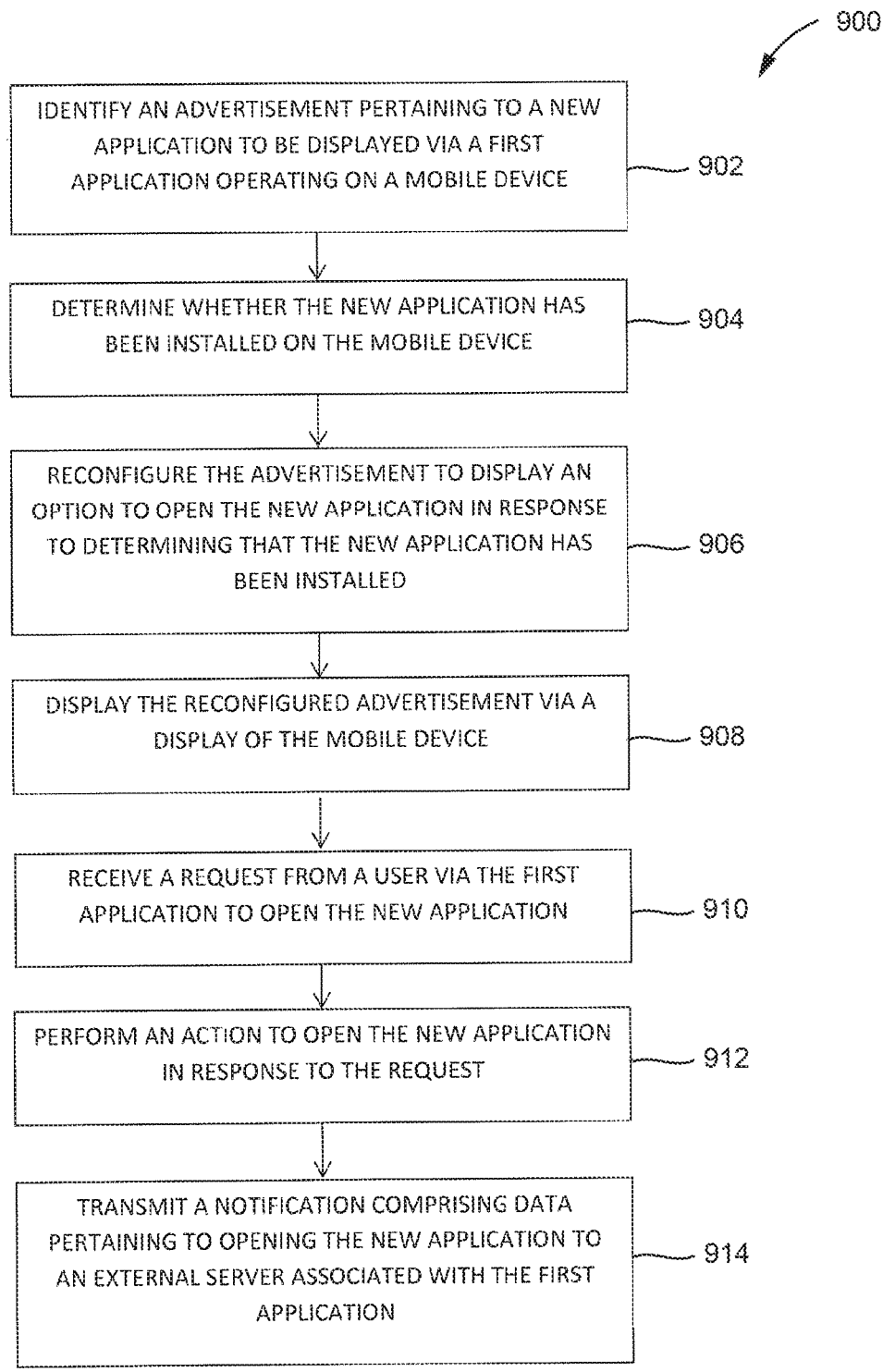
FIG. 9 depicts a flowchart of a method for reconfiguring an advertisement, in accordance with one or more embodiments of the invention.

FIG. 9 depicts a flow chart of a method 900 for reconfiguring a message to be displayed to a user. At step 902, an advertisement for a new application to be displayed via a first application is identified. At step 904, it is determined whether the new application has been installed on the mobile device. At step 906, the advertisement is reconfigured to display an option to open the new application in response to determining that the new application has been installed. At step 908, the reconfigured advertisement is displayed via a display of the mobile device. At step 910, a request from a user via the first application to open the new application is received. At step 912, in response to the request, an action to open the new application is performed. In one embodiment, the action performed is a call is transmitted to an operating system of the mobile device to open the new application. At step 914, a notification comprising data pertaining to opening the new application is transmitted to an external server associated with the first application. In one embodiment, the data is for tracking conversion of the new application and tracking an advertising budget of an entity associated with the new application.

Application developers can be provided with an app card builder to assist in generating cards that use deeplinks. In one embodiment, the app card builder provides a developer (or marketer or any other user generating a card) with an explanation of how deeplinks and deeplink schemas are used. The app card builder can provide a suggested deeplink schema to the developer using an app id lookup to identify a deeplink schema in a mact_apps table for a particular app based on an app id provided by the developer. For example, a deeplink schema can be identified in the mact_apps table using a name of an app or other app identifier provided by the developer. The developer can choose to confirm use of the suggested deeplink schema or provide a different and/or new deeplink schema for an app. In situations where the developer provides a different and/or new deeplink schema, that deeplink schema will be enabled for use (e.g., for use with a particular card that the developer is generating and/or with other cards) and entered into a table, such as a mact_apps table for later identification and use. In situations where a developer provides a different and/or new deeplink schema for a particular app, an additional step of confirming that the developer is authorized to create the different and/or new deeplink schema before that deeplink schema is saved to a table (e.g., the mact_apps table) and/or available for use. For example, the developer may have to provide some type of identification or authorization indicating that the developer has the authority to create a new deeplink schema for a particular app before that deeplink schema is saved to a table and/or available for use.

Deeplinks and queries can also be used for various additional functions. For example, deeplinks and queries associated with deeplinks can be used to modify how an app presents information to a user. In one embodiment, a newly installed messaging app can use queries to determine what other apps are installed on a mobile device. The messaging app can then present messages or cards to a user advertising apps for download and installation that are not currently on the mobile device.

Figure 10:
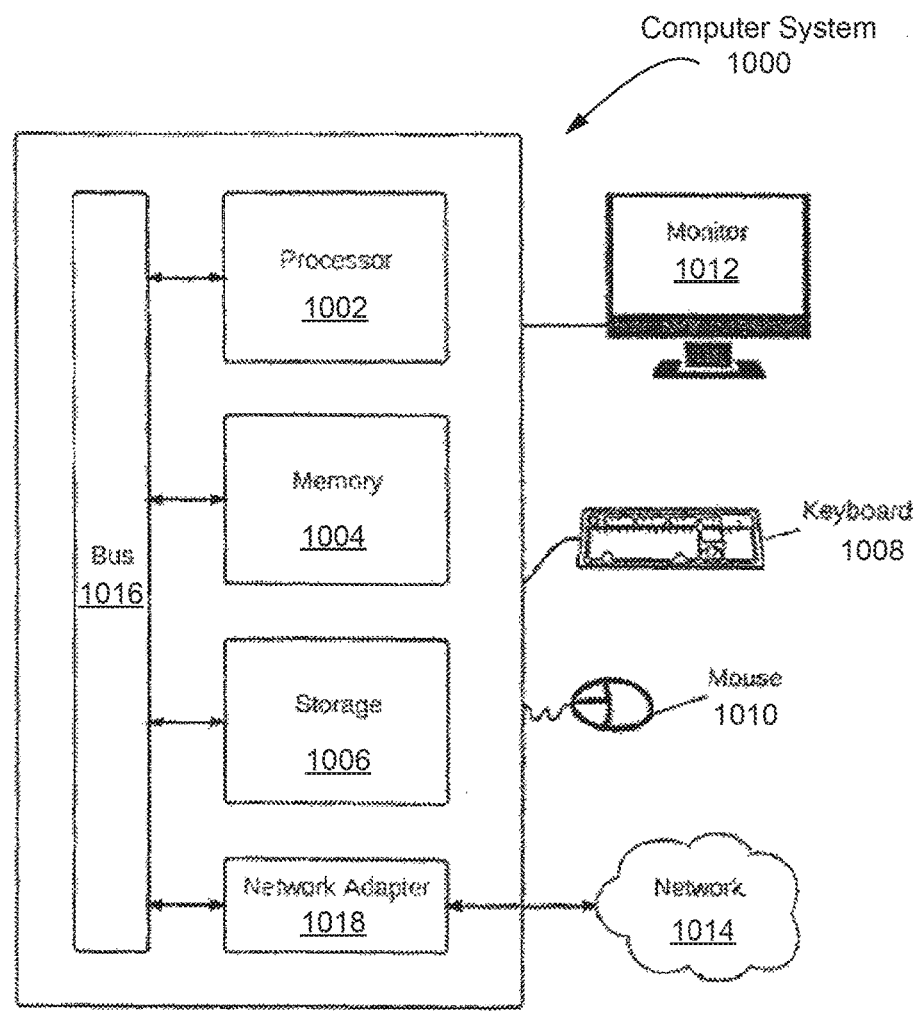
FIG. 10 shows a computer system, in accordance with one or more embodiments of the invention.

Embodiments of the invention may be implemented on a specialized computer system. For example, as shown in FIG. 10, a computer system 1000 includes one or more processor (s) 1002 (such as a central processing unit (CPU), integrated circuit, hardware processor, etc.), associated memory 1004 (e.g., RAM, cache memory, flash memory, etc.), a storage device 1006 (e.g., a hard disk, an optical drive such as a compact disk drive or digital video disk (DVD) drive, a flash memory stick, etc.), a network adapter 1018, and numerous other elements and functionalities typical of today's computers (not shown). One or more components of the computer system 1000 may be communicatively connected by a bus 1016. The computer system 1000 may also include input means, such as a keyboard 1008, a mouse 1010, touch screen (not shown) or a microphone (not shown). Further, the computer system 1000 may include output means, such as a monitor 1012 (e.g., a liquid crystal display (LCD), a plasma display, touch screen, or cathode ray tube (CRT) monitor). The computer system 1000 may be connected to a network 1014 (e.g., a local area network (LAN), a wide area network (WAN) such as the Internet, or any other type of network) via the network adapter 1018. Those skilled in the art will appreciate that many different types of computer systems exist, and the aforementioned input and output means may take other forms. Generally speaking, the computer system 1000 includes at least the minimal processing, input, and/or output means necessary to practice embodiments of the invention. For example, in one embodiment, mobile device 102 of FIG. 2 is implemented using components shown in FIG. 10 as follows. Operating system 202, messaging app 206, polling module 208, and previously installed app 204 can be stored in storage 1006 before being loaded into memory 1004 via bus 1016 for execution by processor 1002. New app 210 can be downloaded to storage 1006 and then loaded into memory 1004 via bus 1016 for execution by processor 1002. User device 102 can utilize a touch screen display comprising functionality of monitor 1012 and mouse 1010 shown in FIG. 10. User device 102 can also include a virtual keyboard having functionality similar to keyboard 1008 of FIG. 10. Further, in one or more embodiments of the invention, one or more elements of the aforementioned computer system 1000 may be located at a remote location and connected to the other elements over a network.

Further, one or more elements of the above described computers and systems (e.g., mobile device 102, computers 106, 108, and 110, etc. of FIG. 1, discussed above) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems (e.g., FIG. 1) and/or flowcharts (e.g., FIG. 8), in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While various embodiments have been described and/or illustrated wherein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method comprising:
   displaying, via a first application operating on a mobile device, an option to install a new application;
   receiving a request from a user via the first application to download the new application;
   performing, in response to the request, an action to enable the user to initiate download of the new application;
   determining, after performing the action, whether the new application has been installed via one or more calls made from the first application to the operating system of the mobile device; and
   transmitting, to an external server associated with the first application, a notification comprising data pertaining to the installation of the new application.

2. The method of claim 1, wherein the determining whether the new application has been installed comprises:
   polling the operating system of the mobile device to determine whether the new application has been installed.

3. The method of claim 2, wherein the polling comprises:
   querying the operating system to determine if the new application is currently installed on the mobile device.

4. The method of claim 2, wherein the polling comprises:
   querying the operating system to determine all applications currently installed on the mobile device; and
   determining if the new application is identified in a list of all applications currently installed on the mobile device generated by the operating system in response to the query.

5. The method of claim 1, further comprising:
   displaying a notification via a display of the mobile device indicating that the new application has been installed in response to determining that the new application has been installed.

6. The method of claim 5, wherein the notification is displayed within the first application in response to determining that the first application is active.

7. The method of claim 5, wherein the notification is displayed via a pop-up message in response to determining that the first application is executing and not active.

8. The method of claim 5, wherein the displaying the notification to the user comprises displaying an option to open the new application.

9. The method of claim 2, wherein the polling occurs a predetermined amount of time after initiating download and periodically during download and installation of the new application.

10. The method of claim 1, wherein the data of the notification transmitted to the external server comprises an indication that a user requested installation of the new application, an indication that the new application was installed, and dates and times associated with the request for installation of the new application and the installation of the new application.

11. The method of claim 8, wherein the data of the notification transmitted to the external server comprises an indication that a user requested to open the new application and a date and time associated with when the new application was opened.

12. The method of claim 1, wherein the displaying an option to install the new application comprises:
   displaying the option to install the new application in a message of the first application comprising an advertisement related to the new application,
   wherein the data pertaining to the installation of the new application comprises information related to conversion of the new application for monetization.

13. The method of claim 1, wherein the performing the action comprises:
   transmitting a call to an operating system of the mobile device to initiate download of the new application.

14. The method of claim 13, wherein the transmitting the call to the operating system comprises:
   requesting that an app store or application marketplace is launched by the mobile device by transmitting a message comprising a deeplink identifying the new application, wherein the app store or application marketplace uses information in the deeplink to identify the new application and display an option to install the new application via a display of the mobile device in response to the requesting.

15. The method of claim 2, wherein the polling ends 15 minutes after the receiving a request from the user to download the new application if it is determined that the new application has not been installed.

16. The method of claim 2, further comprising:
continuing to poll the operating system for a remaining polling period in response to the first application being re-opened after the first application has been closed before the end of the polling period,
wherein the data of the notification includes an indication that the new application has been installed in response to determining that the new application has been installed.

17. The method of claim 2, further comprising:
polling the operating system once in response to the first application being reopened after the end of the polling period and after being closed during the polling period.

18. A method comprising:
identifying an advertisement to be displayed via a first application operating on a mobile device, the advertisement pertaining to installing a new application;
determining whether the new application has been installed on the mobile device;
reconfiguring the advertisement to display an option to open the new application in response to determining that the new application has been installed;
displaying the reconfigured advertisement via a display of the mobile device.

19. The method of claim 18, further comprising:
receiving a request from a user via the first application to open the new application;
performing, in response to the request, an action to open the new application.

20. The method of claim 19 wherein the performing an action comprises:
transmitting a call to an operating system of the mobile device to open the new application.

21. The method of claim 20, further comprising:
transmitting, to an external server associated with the first application, a notification comprising data pertaining to opening the new application, the data for tracking conversion of the new application and tracking an advertising budget of an entity associated with the new application.

22. A mobile device comprising:
a display;
communication circuitry;
an input device; and
processing circuitry in communication with the display and the input device, the processing circuitry configured to at least:
execute a first application;
display, on the display, via the first application, an option to install a new application;
accept, from the input device, via the first application, an input requesting download of the new application;
perform, in response to the request, action to enable initiating download of the new application;
determine, after performing the action, whether the new application is installed via one or more calls made from the first application to the operating system of the mobile device; and
transmit, to an external server associated with the first application, via the communication circuitry, a notification comprising data pertaining to installation of the new application.

23. The mobile device according to claim 22, wherein the first application is a messaging application and the external server associated with the first application is a messaging server.

24. The mobile device according to claim 22, wherein the option to install a new application comprises part of an app card.

\* \* \* \* \*